United States Patent
Mita et al.

(10) Patent No.: US 8,107,737 B2
(45) Date of Patent: Jan. 31, 2012

(54) SHAPE EVALUATION METHOD, SHAPE EVALUATION DEVICE, AND 3D INSPECTION DEVICE

(75) Inventors: Taichi Mita, Toyota (JP); Hideo Tsutamori, Nagoya (JP); Hiroyuki Nakagawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 513 days.

(21) Appl. No.: 12/441,446

(22) PCT Filed: May 20, 2008

(86) PCT No.: PCT/JP2008/059606
§ 371 (c)(1),
(2), (4) Date: Mar. 16, 2009

(87) PCT Pub. No.: WO2008/146764
PCT Pub. Date: Dec. 4, 2008

(65) Prior Publication Data
US 2009/0268965 A1  Oct. 29, 2009

(30) Foreign Application Priority Data

May 25, 2007  (JP) ................................. 2007-139268

(51) Int. Cl.
*G06K 9/46*  (2006.01)
*G01B 11/30*  (2006.01)
*G01B 3/22*  (2006.01)
(52) U.S. Cl. .......................... 382/190; 356/612; 702/167
(58) Field of Classification Search .................... None
See application file for complete search history.

(56) References Cited

U.S. PATENT DOCUMENTS
2008/0088855 A1  4/2008 Maekawa et al.

FOREIGN PATENT DOCUMENTS
| JP | 6 194148 | 7/1994 |
| JP | 7 332950 | 12/1995 |
| JP | 8 123835 | 5/1996 |
| JP | 11 110437 | 4/1999 |
| JP | 2006 329898 | 12/2006 |
| WO | 2006 073036 | 7/2006 |
| WO | WO 2006073036 A1 * | 7/2006 |

\* cited by examiner

*Primary Examiner* — Samir Ahmed
*Assistant Examiner* — Fred Hu
(74) *Attorney, Agent, or Firm* — Oblon, Spivak, McClelland, Maier & Neustadt, L.L.P.

(57) ABSTRACT

To appropriately evaluate a surface shape of an object to be inspected regardless of the relative positions of a light source and an image-taking device with respect to the object. When evaluating a surface shape, it includes a shape recognition step for recognizing the surface shape of the object to be evaluated, a representative point extraction step for extracting a representing point from the recognized surface shape of the object to be evaluated, a shape specifying step for specifying a shape for a predefined area around the extracted representing point, a vector defining step for defining a light source direction vector with respect to each of the representing points, a representing point select step for selecting, from among all of the representing points, only representing points for which imaginary reflection vectors corresponding to the light source direction vectors are contained within a predefined range from an imaginarily defined direction, and a highlight line creation step for creating a highlight line that is imaginarily generated on the surface of the object to be evaluated based on the highlight point group, i.e., a group of all of the selected representing points, wherein an evaluation of the surface shape of the object to be evaluated is performed based on the created highlight line.

12 Claims, 11 Drawing Sheets

SHAPE EVALUATION METHOD, SHAPE EVALUATION DEVICE, AND 3D INSPECTION DEVICE

TECHNICAL FIELD

The present invention relates to a shape evaluation method and a shape evaluation apparatus to evaluate the surface shape of an object to be evaluated such as a vehicle in three dimensions, and also relates to a three-dimensional inspection apparatus to inspect the surface shape of an object to be inspected.

BACKGROUND ART

A shape inspection called "highlight test" has been commonly known as a technique to evaluate the exterior quality of a car or the like, in which the surface shape of the object to be evaluated is evaluated in three dimensions. In the highlight test, the surface shape of an object to be evaluated is inspected by the flow state of an optical beam pattern that is formed on the surface of the object to be evaluated by collimating an optical beam emitted from a light source such as a fluorescent light and radiating the collimated optical beam to the object through a slit or the like. In such a highlight test, the optical beam pattern formed on the surface of an object to be evaluated is commonly called "highlight lines", and an inspection for projections and depressions and the roundness of the surface shape is performed on the object based on the highlight lines formed on the surface shape of the object. Specifically, an organoleptic test in which a skilled inspector makes visual confirmation and an automatic test in which an image obtained by photographing the surface of an object is compared with an ideal optical pattern have been known (for example, Patent documents 1 and 2).

When the above-described Patent documents 1 and 2 obtain the highlight lines by taking an image of an optical beam pattern formed on the surface of an object to be inspected, they quantify the highlight lines in an attempt to quantitatively evaluate the surface shape quality of the object to be inspected. Specifically, the purpose of a technique described in Patent document 1 is, when it takes image data into a computer as highlight lines, to eliminate noise contained in the taken image data and to quantitatively calculate the surface shape of the object to be inspected from the highlight line data from which noise is eliminated. Furthermore, a technique described in Patent document 2 obtains a pattern that is recognized as highlight lines from image data obtained as a result of photographing by applying the image data to a free-form curve, and the purpose of the technique is to prevent the occurrence of discontinuity problems and uniformity problems in the recognized highlight lines.

[Patent Document 1] Japanese Unexamined Patent Application Publication No. 6-194148

[Patent Document 2] Japanese Unexamined Patent Application Publication No. 7-332950

DISCLOSURE OF THE INVENTION

Problems to be Solved by the Invention

Incidentally, there are some cases in conventional inspection processes of surface shapes where sufficient repeatability for highlight line images obtained by photographing cannot be achieved even though the surface shapes of objects to be inspected are identical because the relative position of an image-taking device to take the highlight line images for the objects to be inspected (i.e., the image-taking viewing field) and the position of a light source are not completely fixed in the strict sense. Therefore, the surfaces of objects that are inspected by such techniques are not precisely reproduced in inspection results, and it is difficult to stabilize the inspection results. To stabilize the inspection results, it requires a task to improve the accuracy by establishing plural positions of the light source and plural positions at which images are taken and creating a number of ideal optical beam patterns each of which is based on respective one of these plural positions.

The present invention has been made to solve such problems, and an object of the present invention is to provide a shape evaluation method and a shape evaluation apparatus capable of appropriately evaluating the surface shape of an object to be inspected regardless of the relative positions of a light source and an image-taking device with respect to the object.

Furthermore, another object of the present invention is to provide a three-dimensional inspection apparatus capable of appropriately inspect the surface shape of an object to be inspected regardless of the relative positions of a light source and an image-taking device with respect to the object to be inspected.

Means for Solving the Problems

A shape evaluation method in accordance with the present invention is to solve problems described above, and includes: a shape recognition step for recognizing a surface shape of an object to be evaluated; a representative point extraction step for extracting a representing point from the recognized surface shape of the object to be evaluated; a shape specifying step for specifying a shape for a predefined area around the extracted representing point; a vector defining step for defining a light source direction vector with respect to each of the representing points based on a relative position of a light source to radiate light; a representing point select step for selecting, from among all of the representing points, only representing points for which imaginary reflection vectors corresponding to the defined light source direction vectors are contained within a predefined range from a direction that is imaginarily defined as a visual recognition direction; and a highlight line creation step for creating, by using a group of all of the selected representing points as a highlight point group, a highlight line that is imaginarily generated on the surface of the object to be evaluated based on the highlight point group; wherein an evaluation of the surface shape of the object to be evaluated is performed based on the created highlight line.

With such a shape evaluation method, the light irradiation direction along which light is radiated to an object to be evaluated and the direction of the reflection vector to select representing points, i.e., the direction of the line of sight along which an image of the object to be evaluated is taken can be freely established, and a highlight line (highlight point group) generated on the surface of the object to be evaluated can be obtained. Therefore, it becomes possible to appropriately evaluate the surface shape of an object to be evaluated regardless of the relative positions of the light source and the image-taking device with respect to the object to be evaluated.

Furthermore, it may be also configured such that the only representing points for which a plane defined by a specified shape becomes parallel to a predefined direction vector are selected in the representing point select step. That is, if a certain direction is defined as a direction along which light radiated to an object to be evaluated is visually recognized, the only points on the surface of the object to be evaluated that reflect light in a direction parallel to this visual recognition direction are selected. With such a configuration, it becomes possible to efficiently select a highlight point group radiated on the object to be evaluated.

Furthermore, the highlight line creation step may includes a step to collect highlight points contained in a predefined range with regard to given highlight points among the highlight point group and to determine a straight-line direction from the collected highlight points, and it may be configured such that highlight lines are created by based on polygonal lines formed by connecting straight-line directions that are determined for each of the highlight lines. With such a configuration, it becomes possible to create a highlight line from a group of highlight points in a simple and appropriate manner.

Furthermore, it may be also configured such that a direction to be imaginarily defined as the visual recognition direction is changed and a direction for which an evaluation value used to evaluate the surface shape of an object to be evaluated becomes the maximum or the minimum is defined as the visual recognition direction.

Furthermore, although it may be also configured such that surface shape data of an object to be evaluated is recognized based on a measurement value obtained from a measurement result of the surface shape of the object to be evaluated in the shape recognition step, it may be also configured such that the surface shape data of the object to be evaluated is recognized based on shape data obtained when an object to be evaluated is imaginarily constructed. Especially in the latter case, if an object to be evaluated is one that is manufactured by pressure molding, injection molding, or the like, it is possible to examine the molding conditions, without carrying out actual molding, by imaginarily evaluating the surface shape of a shape constructed in simulation and analyzing surface deformations or the likes caused on the surface before actually manufacturing an object to be evaluated.

Furthermore, although it does not mean to restrict the technique, the representing point extraction step may be also configured such that a plane containing a point group in which points are arranged at regular intervals is projected on the shape data of an object to be evaluated that is imaginarily constructed and the positions on the shape data at which the point group is projected are extracted as the representing points. With such a configuration, it becomes easily possible to extract representing points existing on the shape data substantially uniformly from the entire shape.

Furthermore, a shape evaluation method in accordance with the present invention may be also configured so as to further include a step for correcting shape data based on a result of the surface shape evaluation and performing evaluation repeatedly. With such a configuration, it becomes possible, in the case where an object to be evaluated is imaginarily created, to obtain more appropriate shape data by correcting the imaginary shape data of the object to be evaluated based on the evaluation of the created shape data of the object to be evaluated. Therefore, it is possible to achieve an advantageous effect that defects and the likes in shape, which would otherwise be found after an object to be evaluated is actually manufactured, can be prevented.

Furthermore, the present invention also provides a shape evaluation apparatus to solve problems described above. In particular, the shape evaluation apparatus includes: recognizing a surface shape of an object to be evaluated; extracting a representing point from the recognized surface shape of the object to be evaluated; specifying a shape for a predefined area around the extracted representing point; defining a light source direction vector with respect to each of the representing points based on a relative position of a light source to radiate light; selecting, from among all of the representing points, only representing points for which reflection vectors corresponding to the defined light source direction vectors are contained within a predefined range from a direction defined as a visual recognition direction; creating by using a group of all of the selected representing points as a highlight point group, a highlight line that is imaginarily generated on the surface of the object to be evaluated based on the highlight point group; and evaluating the surface shape of the object to be evaluated based on the created highlight line.

In such a shape evaluation apparatus, the light irradiation direction along which light is radiated to an object to be evaluated and the direction of the reflection vector to select representing points, i.e., the direction of the line of sight along which an image of the object to be evaluated is taken can be freely established, and a highlight line (highlight point group) generated on the surface of the object to be evaluated can be obtained. Therefore, it becomes possible to appropriately evaluate the surface shape of an object to be evaluated regardless of the relative positions of the light source and the image-taking device with respect to the object to be evaluated.

Such a shape evaluation apparatus may further includes a measurement portion to measure the surface shape of an object to be evaluated, and may be configured such that surface shape data is recognized based on a measurement value obtained from a measurement result measured by the measurement portion. In such a case, since shape data of the object to be evaluated is recognized in real time in the evaluation, it becomes possible to easily perform the evaluation process.

Furthermore, such a shape evaluation apparatus may further includes a storage area to store surface shape data obtained when an object to be evaluated is imaginarily constructed, and may be configured such that the surface shape of the object to be evaluated is recognized based on stored surface shape data. If an object to be evaluated is one that is manufactured by pressure molding, injection molding, or the like, such a shape evaluation apparatus can evaluate the surface shape of a shape constructed in simulation and analyze surface deformations or the likes caused on the surface without carrying out actual molding. Therefore, it becomes possible to examine the molding conditions before actually manufacturing an object to be evaluated.

Furthermore, the present invention also provides a three dimension apparatus to solve problems described above. In particular, the present invention provides a three dimension apparatus that includes a measurement portion to measure a surface shape of an object to be inspected and inspects the surface shape of the object to be inspected in three dimensions: recognizes the surface shape of the object to be inspected by the measurement portion; extracts a representing point from the recognized surface shape of the object to be inspected; specifies a shape for a predefined area around the extracted representing point; defines a light source direction vector with respect to each of the representing points based on a relative position of an imaginary light source to radiate light; selects, from among all of the representing points, only representing points for which reflection vectors corresponding to the light source direction vectors that are defined based on the relative position with respect to the light source position are contained within a predefined range from a direction defined as a visual recognition direction; creates, by using a group of all of the selected representing points as a highlight point group, a highlight line that is imaginarily generated on the surface of the object to be inspected based on the highlight point group; and performs an inspection of the surface shape of the object to be inspected based on the created highlight line.

Such a three dimension apparatus can freely establish a light irradiation direction that is based on the position of an imaginary light source that radiates light to an object to be inspected and a direction of the reflection vector to select representing points, i.e., the direction of the line of sight along which an image of the object to be inspected is taken. Therefore, it becomes possible to precisely inspect the surface shape of the object to be inspected regardless of the relative positions of the light source and the image-taking device with respect to the object to be inspected.

Furthermore, since such a three dimension inspection apparatus includes a measurement portion to measure the surface shape of an object to be inspected, the surface shape data is recognized in real time based on a measurement value obtained from a measurement result measured by the measurement portion. Therefore, it is possible to achieve such an advantageous effect that the inspection processes can be carried out easily and continuously.

Advantageous Effects of the Invention

As has been described above, the present invention can appropriately evaluate the surface shape of an object to be evaluated regardless of the relative positions of a light source and an image-taking device with respect to the object to be evaluated.

Figure 1:
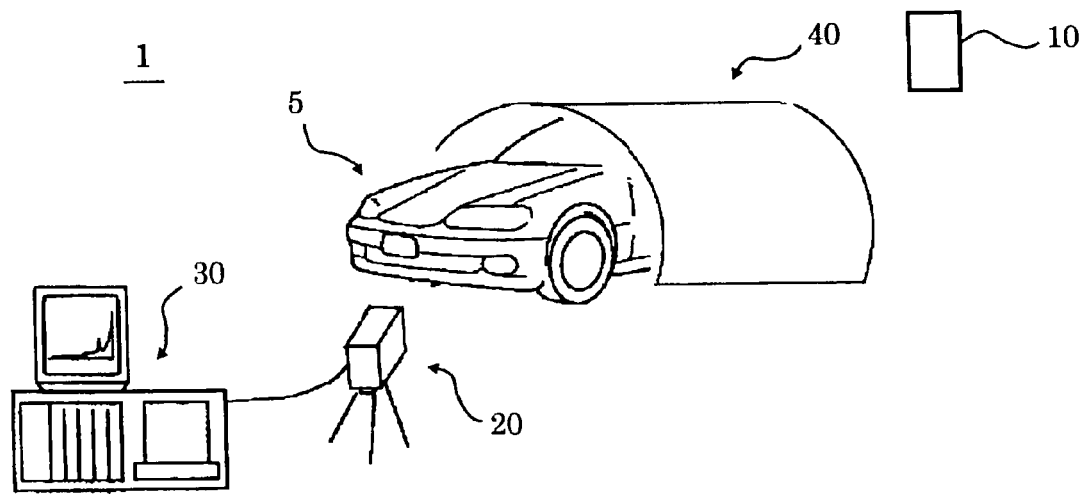
FIG. 1 is a schematic view schematically showing an aspect in which the surface shape of a car body, i.e., an object to be evaluated is evaluated by a shape evaluation apparatus in accordance with a first embodiment.

DESCRIPTION OF REFERENCE NUMERALS 1, 1' shape evaluation apparatus,
5 work (object to be evaluated)
10 measurement portion
20 CCD camera (imaging portion)
30 arithmetic processing portion
31 image processing unit
32 CPU
33 input portion
34 display portion
35 storage area
50 simulation device

BEST MODES FOR CARRYING OUT THE INVENTION

First Embodiment

A shape evaluation apparatus and a shape evaluation method in accordance with a first embodiment of the present invention are explained hereinafter with reference to FIGS. 1 to 15. Note that in this embodiment, an example in which the surface shape of a car body is evaluated as an example of an object to be evaluated is explained.

FIG. 1 schematically shows a shape evaluation apparatus 1 to evaluate the surface shape of a car body, i.e., an object to be evaluated (hereinafter referred to as "work"). The shape evaluation apparatus 1 includes a measurement portion 10 to measure the exterior shape of a work 5 by using an optical technique, and an arithmetic processing portion 30 to take measurement data obtained by the measurement portion 10 and to analyze the taken measurement data. The detail of each component is explained hereinafter.

The measurement portion 10 carries out publicly-known three dimensional shape measurements, and in particular optically measures a shape on the exterior of the work 5 and transmits the measurement data to the arithmetic processing portion 30. The measurement data is disposed at a vehicle position within a cylinder that is imaginarily constructed in the arithmetic processing portion 30. In the arithmetic processing portion 30, a plurality of representing points are extracted from the transmitted measurement data and stored as a point group in the storage area 35.

As the measurement portion 10, a CCD camera 20, for example, can be used to recognize the surface shape of the work 5. The CCD camera 20, which is located at a place where it can take an image of roughly the entire surface of the work 5, obtains imaging data from the surface of the work 5 and transmits the data to the arithmetic processing portion 30. Note that the CCD camera 20 is configured such that its image-taking direction and its stationary position can be changed.

Figure 2:
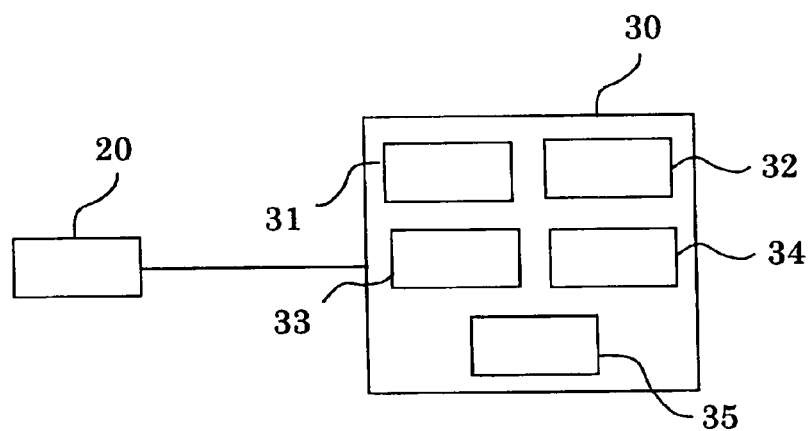
FIG. 2 is a block diagram conceptually showing the internal structure of an arithmetic processing portion contained in the shape evaluation apparatus shown in FIG. 1.

The arithmetic processing portion 30 is constructed by a general-purpose computer or the like, and its internal parts are constructed by an image processing unit 31, a CPU 32, an input portion 33, a display portion 34, a storage area 35 such as a memory, and the like, as shown in FIG. 2. Such an arithmetic processing portion 30 receives imaging data from the CCD camera 20 that is used as the measurement portion 10 and analyzes the imaging data to perform an evaluation on the surface shape of the work 5. The arithmetic processing portion 30 carries out normalization processing including coordinate transformation processing or the like for the input imaging data, and then stores the imaging data. Note that an evaluation technique for the surface shape of the work 5 based on imaging data from the CCD camera 20 is explained later in detail.

Figure 3:
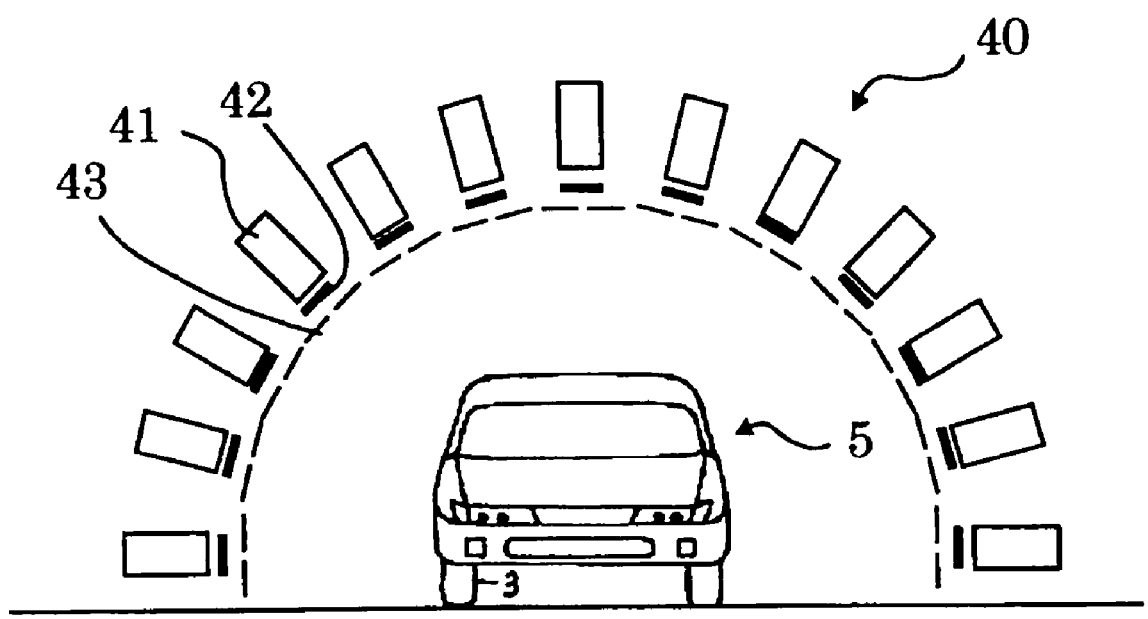
FIG. 3 is a conceptual diagram imaginarily showing the shape evaluation apparatus shown in FIG. 1 in the arithmetic processing portion.

FIG. 3 is a conceptual diagram showing measurement data of the work 5 and a light irradiation portion 40 that are imaginarily constructed in the arithmetic processing portion 30. As shown in FIG. 3, the light irradiation portion 40 includes straight-line light sources 41, 41, ... such as halogen light sources arranged around the work 5 in a roughly cylindrical configuration, diffusion boards 42, 42, ... to convert light from each straight-line light source 41 into collimated light, and shield slits 43, 43, ... to radiate the converted light in a stripe pattern. The straight-line light source 41, the diffusion board 42, and the shield slit 43 are roughly integrally formed, and the coordinates of measurement data of the work 5 are converted along the center line C of the roughly cylindrical shape light irradiation portion 40 and disposed in predefined places by the arithmetic processing portion 30. At this point, an assumption is made that the straight-line light sources 41 and the work 5 have a predetermined relative positional relation. The arithmetic processing portion 30 can imaginarily take an image of roughly the entire surface of the work 5 from a direction inclined at a predefined angle (e.g., 30 degrees) with respect to the cylindrical center direction of the above-described straight-line light source and obtain imaging data from the surface of the work 5. Note that it is configured such that the image-taking direction and the stationary position can be changed.

Figure 4:
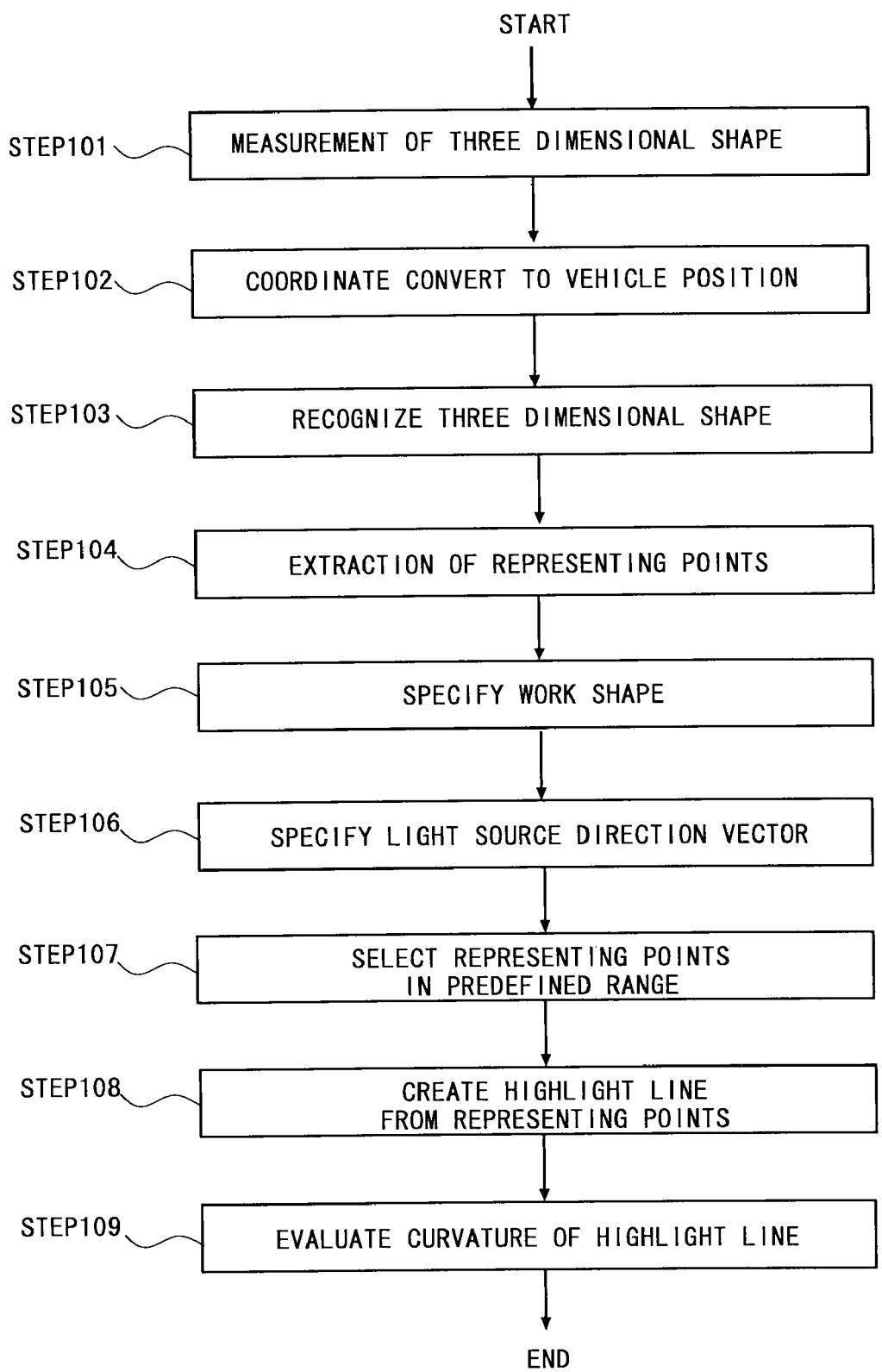
FIG. 4 is a flowchart illustrating procedure to obtain a highlight point group indicating a highlight line based on imaging data on the surface of an object to be evaluated (work)

Procedure in which the shape evaluation apparatus 1 having the above-mentioned structure obtains a highlight point group indicating a highlight line generated on the surface of the work 5 based on measurement data of the work 5 measured by the measurement portion 10 and evaluates the surface shape of the work 5 is explained hereinafter in detail with reference to a flowchart shown in FIG. 4.

Firstly, the shape evaluation apparatus 1 measures the shape of the work 5 in three dimensions by the measurement portion 10 (Step 101), and transmits the measurement data to the arithmetic processing portion 30. The arithmetic processing portion 30 receives the measurement data from the measurement portion 10 and converts the coordinates of the measured work 5 to a vehicle position within a cylindrical light irradiation portion 40 constituted from the straight-line light sources 41 (Step 102). The arithmetic processing portion 30 recognizes the surface shape of the work, i.e., the object to be evaluated in three dimensions (Step 103), and extracts representing points from the surface shape of the recognized work 5 at predefined intervals (Step 104). Any kind of technique can be used for this representing point extraction step (Step 104), provided that the representing points can be extracted such that roughly the entire surface shape of an object to be evaluated is covered. For example, the position coordinate of each measurement point that is defined at predefined intervals at which measurement portion 10 carries out the measurements can be extracted as a representing point without any modification. Note that when representing points are extracted from the surface of an object to be evaluated, it is preferable that representing points to be extracted are averaged such that the extracted representing points are uniformly spread over the surface of the work 5, so that the representing points are extracted roughly uniformly from the entire surface of the work 5.

Figure 5:
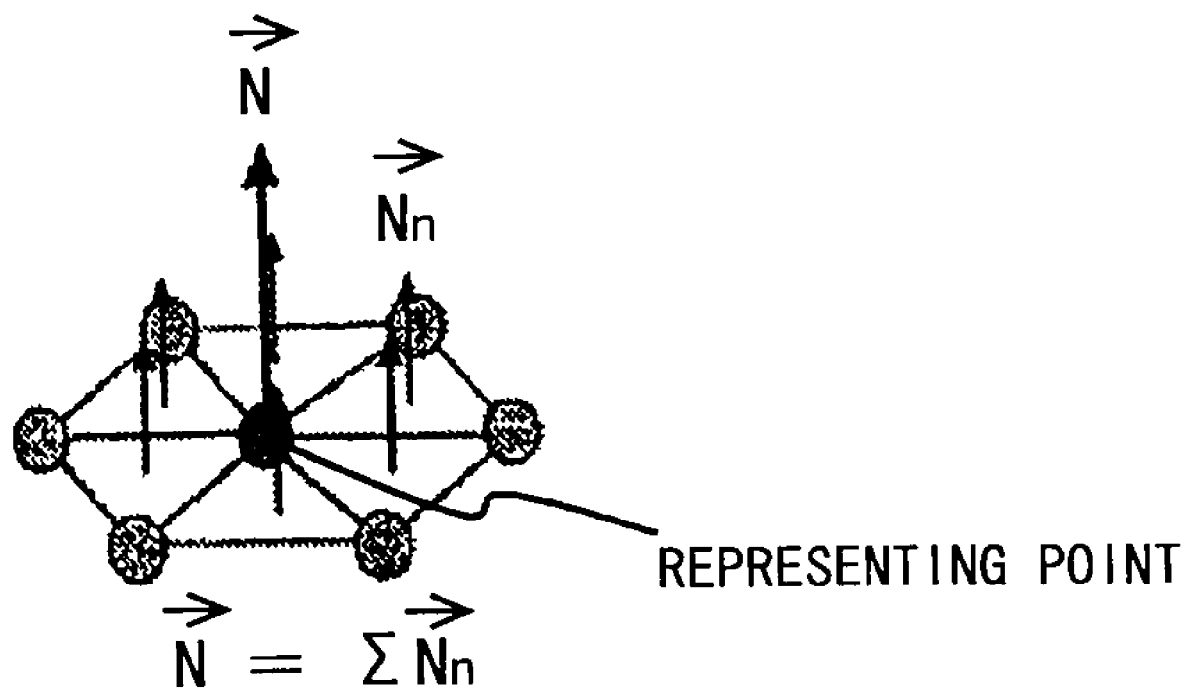
FIG. 5 shows an aspect in which a normal vector at a point on the surface of an object to be evaluated is calculated.

Next, by using each position of the extracted representing points as the center, a shape of each predefined area on the surface shape of the object to be evaluated is specified (Step 105). Specifically, as shown in FIG. 5, the surface of the object to be evaluated is expressed by a group of minute triangles; the outer product (Nn) of the two vectors formed by the vertex and each of the other two points of the triangle is calculated for each triangle existing around each position extracted as the representing point; a vector is calculated by dividing by the product of the lengths of these two vectors for each triangle; and normalization is performed by calculating the sum (SNn) of these calculated vectors. The normalized vector obtained in such a manner becomes a normal vector at each representing point, and that means the surface of the object to be evaluated is specified by a plane at each of the representing points.

Next, a light source direction vector of the light source 41 along which light is radiated to each representing point is defined from the relative positional relation between each of representing points extracted on the surface shape of the work 5 and each of the straight-line light sources 41 (Step 106). The defined light source direction vector is stored in the storage area 35 of the arithmetic processing portion 30. Next, only the representing points for which reflection vectors corresponding to the defined light source direction vectors are contained in a predefined range from a direction defined as a visual recognition direction are selected from among all of the representing points extracted on the surface shape of the work 5 (Step 107). In particular, this step 107 to select the representing points is performed in the following manner.

Figure 6A:
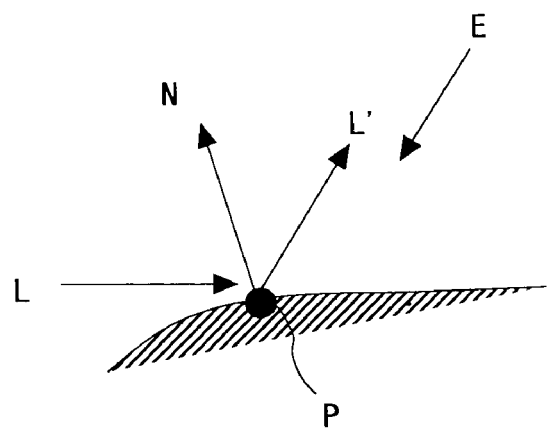
FIG. 6A schematically shows a direction indicating a visual recognition direction, a normal at a corresponding representing point, a plane defined at the representing point (point P), the direction of light radiated to the representing point (point P), and the direction of light reflected at the representing point (point P)

That is, since light that is visually recognized as the highlight line is a group of lights that are reflected by one of the representing points in a direction parallel to a vector indicating the visual recognition direction, the only representing points for which light reflected at one of the representing points coincides with an image-taking direction (visual recognition direction) established in the arithmetic processing portion 30 should be selected. Therefore, as shown in FIG. 6A, assuming that a direction vector indicating the image-taking direction used as the visual recognition direction is a vector E, a normal vector at each representing point (point P) is a vector N, the direction vector of light radiated to the representing point (point P) is a vector L, and the direction vector of light reflected at the representing point (point P) is a vector L', the reflected light at each representing point and the direction vector (visual recognition direction) become parallel to each other when the relation expressed by the following equation (1) is satisfied.

$$L'//E, \text{ that is, an angle } \theta \text{ between } L' \text{ and } E=0 \tag{1}$$

Note that angle θ can be calculated from the following manner.

$$L'·E = |L'||E|\cos\theta$$

$$\cos\theta = L'·E/|L'||E|$$

$$\theta = A\cos(L'·E/|L'||E|)$$

However, since errors are involved in steps to extract the surface shape of an object to be evaluated and representing points in practice, the representing points for which reflection vectors are contained in a predefined range from a visual recognition direction E are selected as expressed by the equation (2). A group of representing points selected in such a manner (representing point group) is defined as a highlight point group.

$$\theta = A\cos(L'·E/|L'||E|) < e \text{ (e: error tolerance)} \quad (2)$$

Figure 6B:
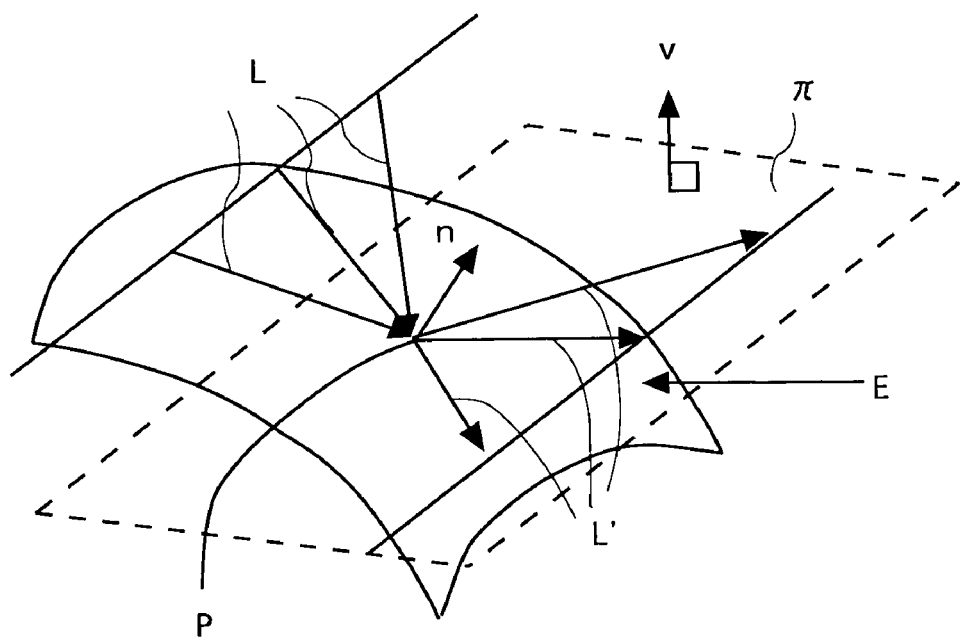
FIG. 6B schematically shows a direction indicating a visual recognition direction, a normal at a corresponding representing point, a plane defined at the representing point (point P), the direction of light radiated to the representing point (point P), and the direction of light reflected at the representing point (point P)

Note that although a case where a point light source is used is explained above, a straight-line light source can be also used in the following manner. That is, since light that is visually recognized as a highlight line is a group of lights that are reflected by one of the representing points in a direction parallel to a vector indicating the visual recognition direction, the only representing points for which light reflected at one of the representing points coincides with an image-taking direction (visual recognition direction) established in the arithmetic processing portion 30 should be selected. Therefore, as shown in FIG. 6B, assuming that a direction vector indicating the image-taking direction used as the visual recognition direction is a vector E, a normal vector at each representing point (point P) is a vector n, a plane defined at the representing point (point P) is p, a normal vector of that plane p is v, the direction vector of light radiated to the representing point (point P) is a vector L, and the direction vector of light reflected at the representing point (point P) is a vector L', a plane at each representing point and the direction vector (visual recognition direction) become parallel to each other when the relation expressed by the following equation (3) is satisfied. Note that all of the reflected lights reflected at the representing point (point P) lie on a single plane, and that plane is represented by p.

$$v·E = 0 \quad (3)$$

However, since errors are involved in steps to extract the surface shape of an object to be evaluated and representing points in practice, the representing points for which reflection vectors are contained in a predefined range from a visual recognition direction E are selected as expressed by the equation (4). A group of representing points selected in such a manner (representing point group) is defined as a highlight point group.

$$|v·E| < e \text{(e: error tolerance)} \quad (4)$$

Furthermore, after the highlight line is created from the highlight point group selected in procedure like the one explained above (Step 108), the curvature of the created highlight line is evaluated (Step 109). A specific example of the step to create the highlight line and a specific example for the curvature evaluation of the highlight line are explained hereinafter in detail.

Figure 7:
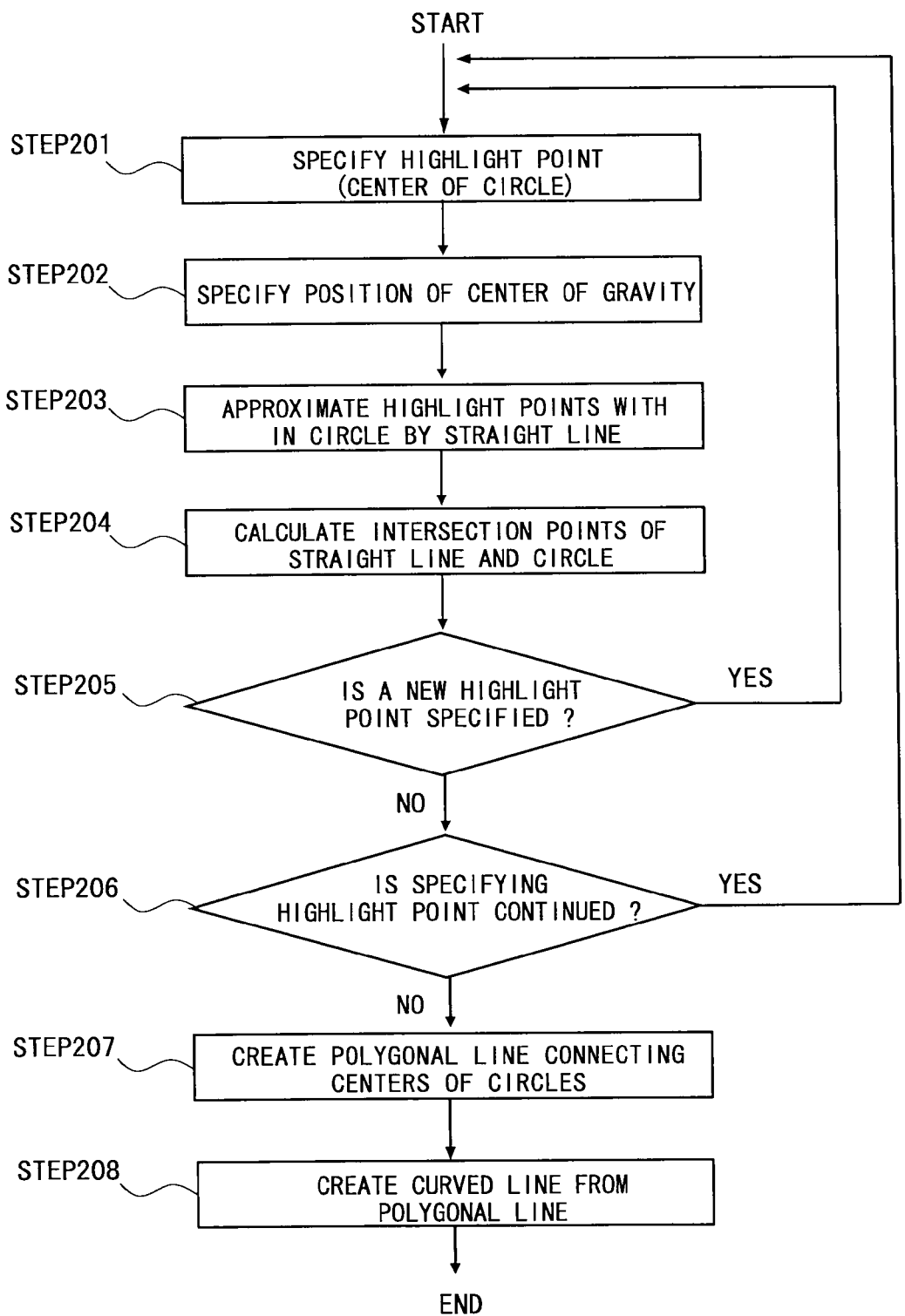
FIG. 7 is a flowchart showing procedure to create a highlight line from a highlight point group.

FIG. 7 is a flowchart to create the highlight line from the highlight point group selected in the above mentioned manner, and FIGS. 8-14 are schematic views showing the outline of procedure to create the highlight line. The detail of the procedure for creating the highlight line is explained hereinafter.

Figure 8:
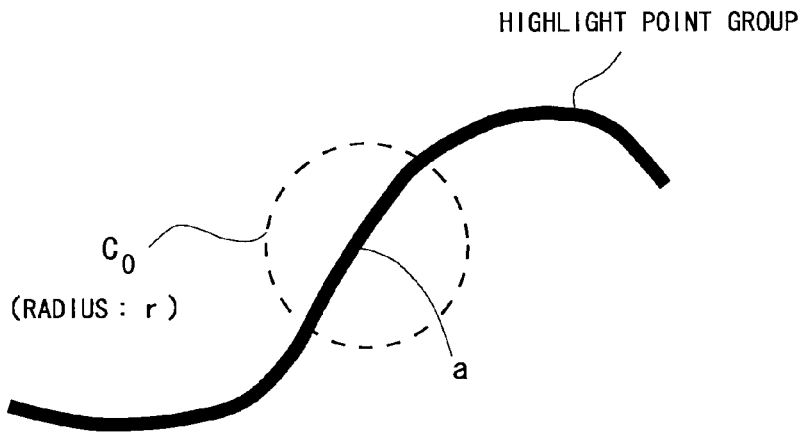
FIG. 8 is a schematic diagram schematically showing procedure to create a highlight line.

Firstly, a given point is specified from the highlight point group (Step 201), and a circle C0 having a radius r (r: minute distance) is drawn using that point as the center as shown in FIG. 8. Then, highlight points contained in this circle C0 is collected, and their barycentric position is defined as a (Step 202). The barycentric position a is stored in the storage area 35 of the arithmetic processing portion 30.

Figure 9:
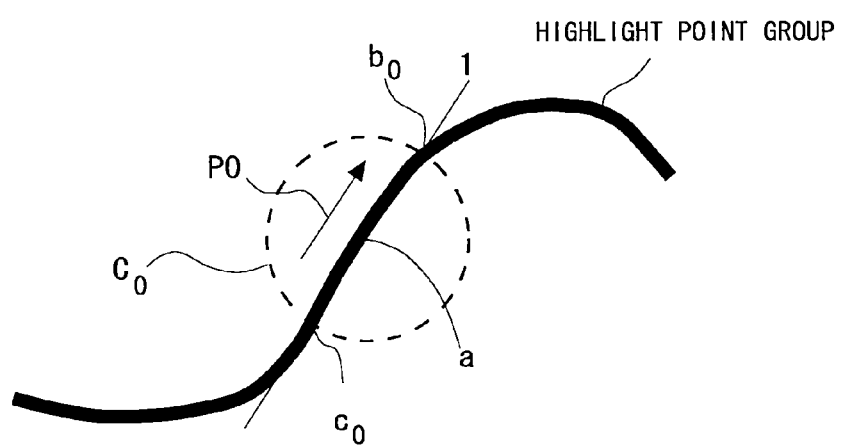
FIG. 9 is a schematic diagram schematically showing procedure to create a highlight line.
Figure 10:
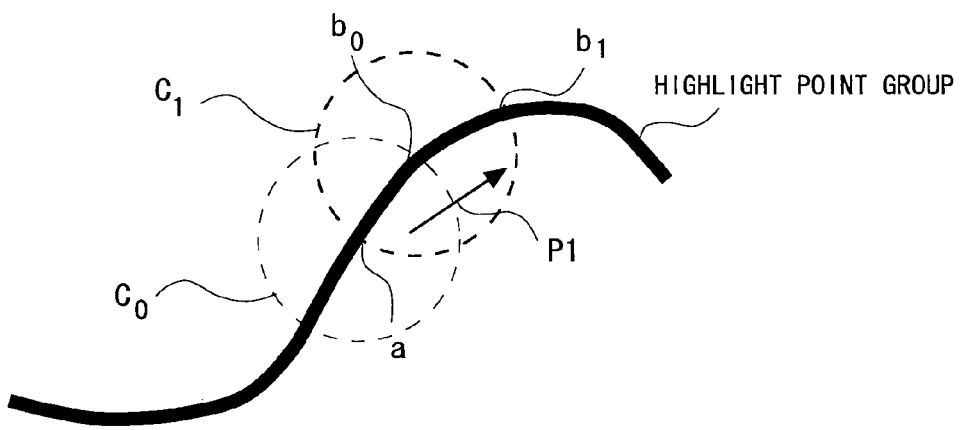
FIG. 10 is a schematic diagram schematically showing procedure to create a highlight line.

Next, the group of highlight points contained in the circle C0 is approximated by a straight-line segment by using a technique such as a least squares method as shown in FIG. 9 (Step 203). Then, the intersection points b0 and c0 of the approximated straight line 1 and the circle C0 are calculated (Step 204), and those calculated intersection points b0 and c0 are stored in the storage area 35 of the arithmetic processing portion 30. Note that the point b0 is located on the forward direction side of an arrow P0 and the point c0 is located on the backward side of the arrow P0.

The intersection points of the circle and the line are obtained in this manner, and the decision whether the center of a new circle is obtained or not is made (Step 205). Then, if it is to be used as the center of a new circle, the process returns to the step 201 and similar calculation is carried out. In such a case, new highlight points contained in a circle C1 that is centered at the stored point b0 and has a radius r are collected; approximation by a straight line is performed with respect to the highlight point group by using a similar technique to the above-described technique; and the intersection points with the circle C1 are obtained in a similar manner. Note that the intersection point on the forward direction side of an arrow P1 shown in FIG. 9 is defined as b1 among the intersection points of the straight line and the circle in this embodiment. Similarly, though graphical illustration is omitted, a new circle is drawn with respect to the intersection point c0; approximation by a straight line is performed with respect to the highlight point group; and a new intersection point is obtained.

Figure 11:
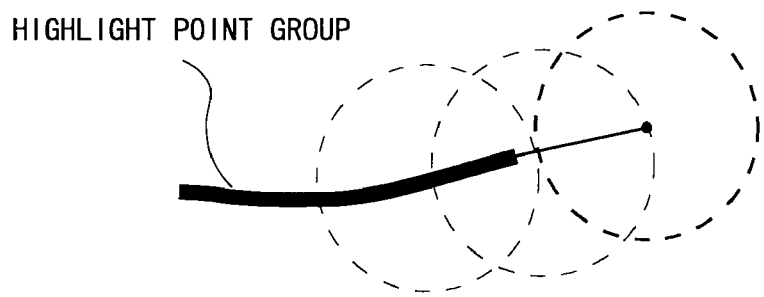
FIG. 11 is a schematic diagram schematically showing procedure to create a highlight line.

Note that there is a case where two intersection points of the circle and the straight line cannot be obtained in the step 205, including a case where approximation by a straight line cannot be performed with respect to the highlight point group. In such a case, it is believed that the specified highlight points may exist in the periphery of the end of the highlight line, for example, as shown in FIG. 11, and therefore the process returns to the step 201 and another highlight point is specified.

Furthermore, though it is not shown in the flowchart, if the barycentric position a obtained in the step 201 is contained in the created circle C1 in the step 203, it is determined that the group of the highlight points is in a closed state in the periphery of the specified given highlight points, so that the process returns to the step 201 and another highlight point is specified.

Figure 12:
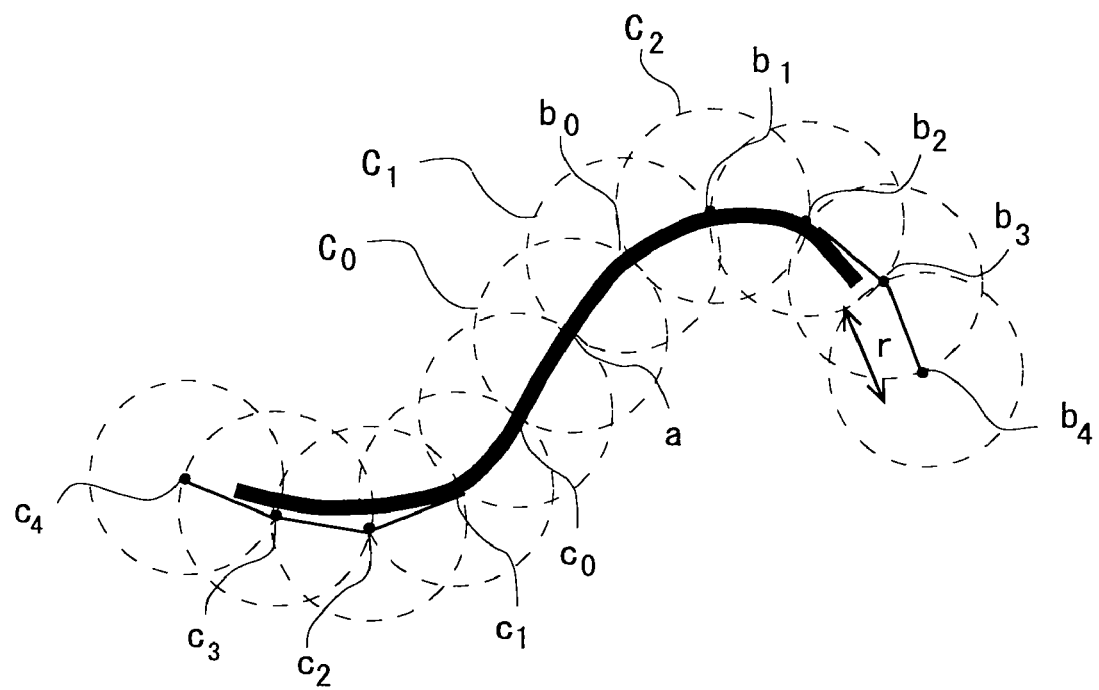
FIG. 12 is a schematic diagram schematically showing procedure to create a highlight line.

In this manner, the whole highlight point group or a sufficient number of highlight points in the highlight point group is approximated in a segmental manner by straight-line segments, and the circles (circles C0-Cn) are created. Then, when it is determined that there is no longer any need to specify a highlight point as the center of circle (Step 206), a polygonal line in which each segment has a length r as shown in FIG. 12 is created by connecting the centers of these created circles (Step 207).

Figure 13:
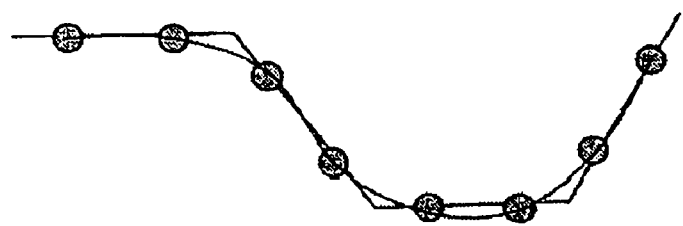
FIG. 13 is a schematic diagram schematically showing procedure to create a highlight line.

Next, from the polygonal line created in such a manner, a curved line passing through predefined point(s) of each of the segment is created (Step 208). FIG. 13 is an example of a curved line created in such a manner, and is a third-order spline curve passing though points located at one fourth and three fourth of each segment. Then, the curved line created in such a manner is defined as the highlight line, and the surface shape of the object to be evaluated is evaluated by using this highlight line.

Figure 14:
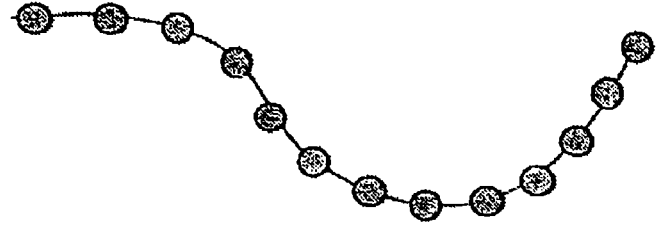
FIG. 14 is a schematic diagram schematically showing procedure to create a highlight line.

Next, a specific technique that is performed in the above-described step 109 for the curvature evaluation of a highlight line displayed on the surface of an object to be evaluated is explained hereinafter. FIG. 14 is a spline curve created by adding evaluation points at regular intervals (=d) to the spline curve shown in FIG. 13. The interval (=d) at which the evaluation points are added is set to a minute interval of around 0.1-1.5 mm.

As a technique to evaluate a curvature using evaluation points added in such a manner, a technique in which, for example, a curved line passing through three evaluation points, i.e., one evaluation point and evaluation points on both sides of that one evaluation point is approximated based on these three evaluation points, and the curvature of this approximated curved line is obtained can be used. Furthermore, in addition to this technique, a technique in which: a circle that is centered at an evaluation point and has a radius R (e.g., R=15 mm) is drawn; a highlight point group contained in this circle is approximated by a circular arc; and the curvature of the obtained circular arc is defined as the curvature at the evaluation point used as the center; can be also used as the technique to evaluate a curvature. Note that other various known techniques can be also used as the technique to evaluate a curvature.

Figure 15:
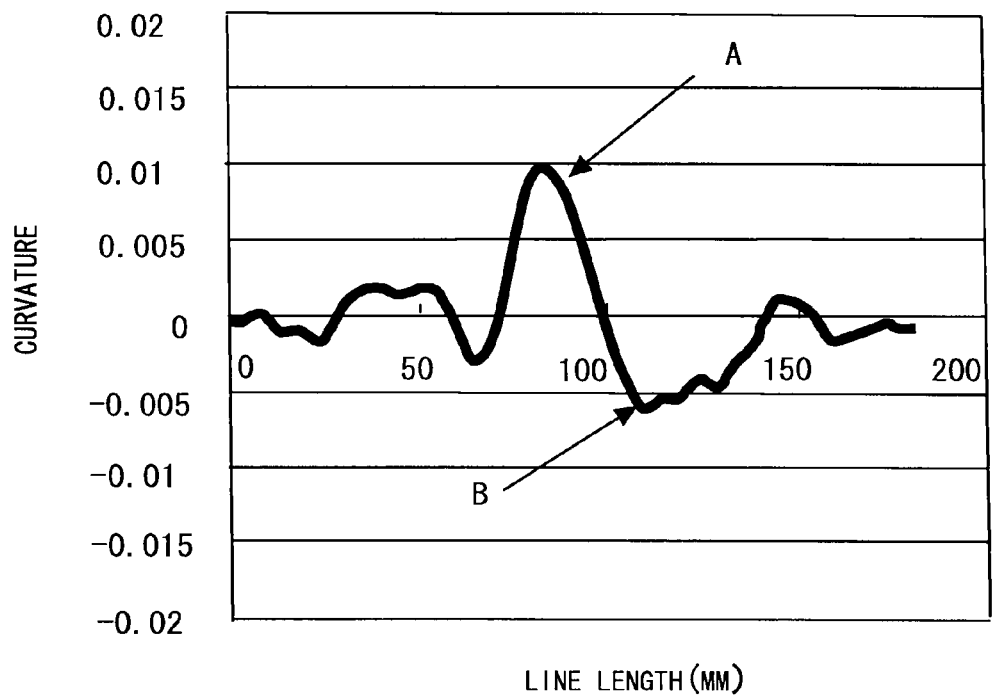
FIG. 15 is a graph showing the curvatures of a highlight line specified on the surface of an object to be evaluated (work)

FIG. 15 shows an example of a result of a curvature at each evaluation point obtained in such a manner. FIG. 15 is a graph showing the curvature of a highlight line specified on the surface of the work 5, and the horizontal axis indicates line length (mm) and vertical axis indicates curvature. As can be seen from this graph, points having somewhat large curvatures in FIG. 15, i.e., a point A (curvature is about 0.01) and a point B (curvature is about 0.006) are recognized as defects on the surface shape. In this manner, it is possible to find defects in the surface shape of the entire work 5 by obtaining curvatures of each highlight line with respect to the surface shape of the work 5. Note that it may be also configured such that when the surface shape of the work 5 is to be displayed, the display method is changed based on curvature information obtained in the above-described manner. That is, it is possible to visually recognize a state indicating a defect in the surface shape of the work 5 with ease by dividing the curvatures into predefined curvature ranges using color coding or a similar method and visually displaying the surface shape of the work 5.

Note that as a technique to visually indicate a surface shape state for a work like the one described above, it is also possible to indicate the surface shape state based on the rate of change in curvature, instead of based on the curvature of the obtained surface shape. Such a technique is more preferable because variations in the surface shape of an object to be evaluated are visually displayed in a more distinct manner.

This embodiment is merely an embodiment to represent a shape evaluation apparatus and a shape evaluation method in accordance with the present invention, and is not shown to limit the present invention. For example, although this embodiment measures the shape of a work, i.e., an object to be evaluated, obtains a highlight line that is drawn on the object to be evaluated by light radiated to the actual object to be evaluated by using the measured shape, and evaluates its surface shape (evaluation), the present invention can be also used to evaluate the surface shape of an object to be evaluated that is imaginarily created (evaluation).

For example, in a case where a shape evaluation is performed on the surface shape of an molded article formed by a mold or the like, it is possible to evaluate the surface shape of the molded article by imaginarily radiating light to an imaginary molded article created in simulation and obtaining an imaginarily generated highlight line before actually manufacturing the molded article. A specific example of such a case is explained hereinafter.

Second Embodiment

Figure 16:
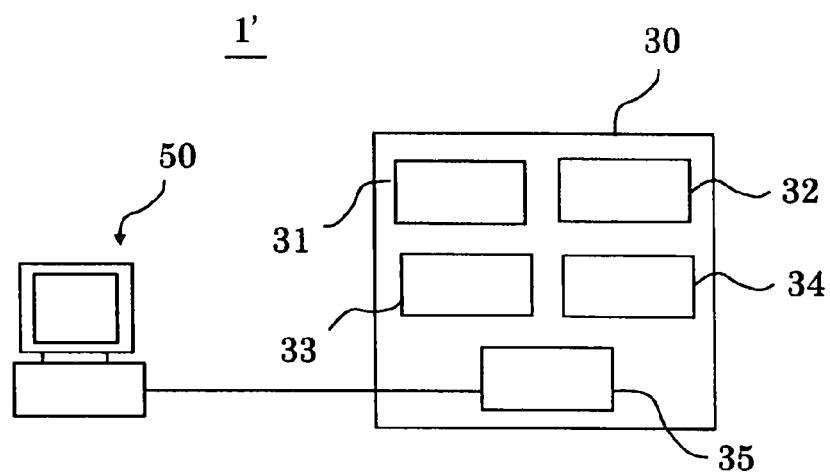
FIG. 16 is a schematic view schematically showing the structure of a shape evaluation apparatus in accordance with a second embodiment.
Figure 17:
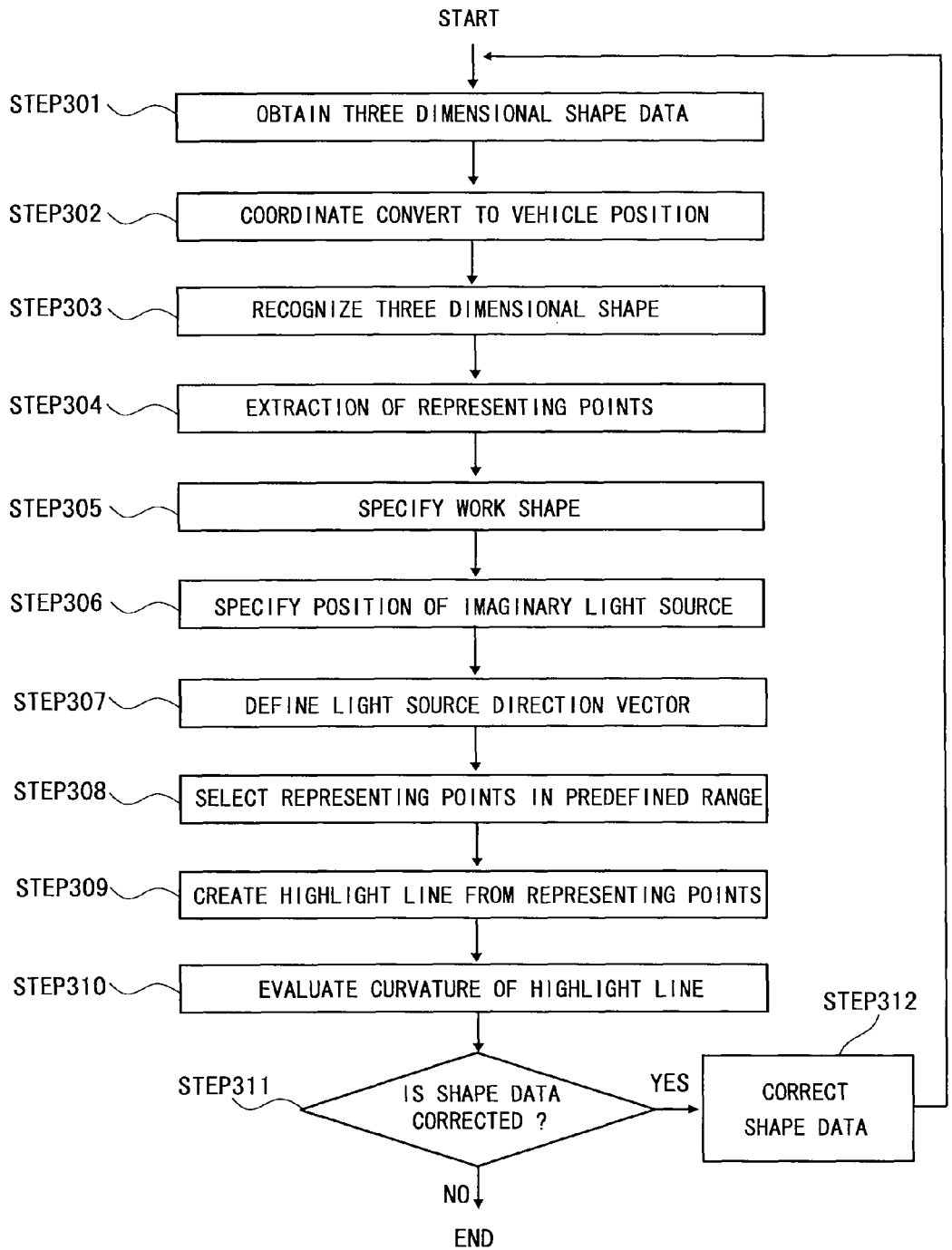
FIG. 17 is a flowchart showing procedure to imaginarily carry out a surface shape evaluation of a panel that is imaginarily constructed in the shape evaluation apparatus in accordance with the second embodiment.

Since an object to be evaluated is imaginarily created in this embodiment, the measurement portion to actually measure its shape is unnecessary. In this embodiment, since an evaluation is performed on the surface shape of an object to be evaluated that is imaginarily created (evaluation), a shape evaluation apparatus 1' is constructed, as shown in FIG. 16, by connecting a simulation device 50 to imaginarily create an object to be evaluated to the arithmetic processing portion 30 explained in the above-described embodiment. Note that although an example in which the arithmetic processing portion 30 and the simulation device 50 are constructed as separate components is shown in this embodiment, they may be constructed by a single computer. An example in which a surface shape evaluation is imaginarily performed on a panel that is imaginarily constructed by such a shape evaluation apparatus 1' in the simulation device 50 is explained hereinafter with reference to a flowchart shown in FIG. 17.

Firstly, the shape data of the imaginary panel constructed in the simulation device 50 is obtained (Step 301); the coordinates of the obtained shape data is converted to a vehicle position in the arithmetic processing portion 30 (Step 302); and then a three dimensional shape is recognized based on the shape data (Step 303). Furthermore, representing points are extracted from the recognized shape of the panel at predefined intervals in the arithmetic processing portion 30 (Step 304). In this representing point extracting step (Step 304), a plane containing a point group arranged in regular intervals is projected on the shape data of the imaginarily constructed panel, and the positions at which the point group is projected are extracted as representing points. In this manner, representing points to be extracted on the shape data are extracted roughly uniformly from the entire shape data.

Next, by using each position of the extracted representing points as the center, a shape for each predefined area in the surface shape of the object to be evaluated is specified (Step 305). Since this shape specifying step is carried out in a similar manner to that of the above-described embodiment, explanation of it is omitted.

Next, the relative position of an imaginary straight-line light source is determined for each representing point extracted on the shape data of the panel (Step 306). The position of the straight-line light source can be arbitrarily determined. Then, a light source direction vector of the light source along which light is radiated to each representing point is defined from the relative positional relation between the straight-line light source and the panel (Step 307), and the defined light source direction vector is stored in the storage area 35 of the arithmetic processing portion 30.

Next, only the representing points for which reflection vectors corresponding to the defined light source direction vectors are contained in a predefined range from a direction defined as a visual recognition direction are selected from among all of the representing points extracted on the surface shape of the panel (Step 308). Since this representing point select step is carried out in a similar manner to that of the above-described embodiment, detailed explanation of it is omitted.

Then, a highlight line is imaginarily created from the highlight point group selected in procedure like the one explained above (Step 309), and the curvature of the created highlight line is evaluated (Step 310). Since specific examples of the highlight line creation step and the highlight line curvature evaluation are also similar to those of the above-described embodiment, detailed explanation of them is omitted.

Then, the evaluation of the created shape data is compared with a predefined criterion based on the curvature of the evaluated highlight line (Step 311). Then, if a sufficient evaluation is not obtained, the shape data is corrected (Step 312) and an evaluation is performed again from the step 301. The shape data correction and evaluation are repeated until a certain criterion is satisfied.

In this manner, imaginarily created shape data is repeatedly corrected by repeating the imaginary evaluation on the surface shape of the shape data, so that it is possible to eliminate defects in the imaginarily created shape data before actually manufacturing a molded article. Therefore, defects, which would otherwise occur when a molded article is actually manufactured, are prevented by using such post-correction shape data.

Note that although examples where a surface shape evaluation is performed on an object to be evaluated are explained in both of the above-described embodiments, the present invention is not limited to those examples. For example, the present invention is also applicable to a three-dimensional inspection apparatus to inspect the surface shape of an object in three dimensions. That is, when the present invention is applied to a three-dimensional inspection apparatus that includes measurement means to measure shape data of an object to be inspected and inspects the surface shape of the object to be inspected in three dimensions based on the measurement data, it becomes possible to perform an inspection on the three-dimensional shape with high accuracy.

In this three-dimensional inspection, the surface shape of the object to be inspected is recognized by measuring the surface shape with a measurement portion, and then representing points are extracted from the recognized surface shape of the object to be inspected in a similar manner to that of the above-described embodiments. Then, a shapes for predefined areas around the extracted representing points are specified; a light source direction vector with respect to each of the representing points is defined based on the relative position of a light source to the representing point; and, only the representing points for which reflection vectors corresponding to the defined light source direction vectors are contained within a predefined range from a direction that is defined as a visual recognition direction for the surface of the object to be inspected is selected from among all of the representing points.

Furthermore, a group of all of the representing points selected in such a manner is defined as a highlight point group; a highlight line that is imaginarily generated on the surface of the object to be inspected is created based on this highlight point group; and an inspection of the surface shape of the object to be inspected is performed based on the created highlight line. In particular, a technique in which: the curvature and the rate of change in curvature of a created highlight line is obtained for each highlight point; and it is determined to be abnormal if the curvature or the rate of change in curvature exceeds a reference value; may be used as an inspection technique based on a highlight line in a similar manner to the above-described embodiments. Note that examples of the inspection techniques are not limited to this example, and a wide range of known techniques can be used.

As has been explained above, a shape evaluation apparatus and a shape evaluation method as well as a three-dimensional inspection apparatus enable an appropriate evaluation/inspection of the surface shape of an object to be evaluated or an object to be inspected regardless of the relative positions of a light source and an image-taking device with respect to the object to be evaluated.

Note that although examples in which a vehicle and a panel are used as objects to be evaluated or objects to be inspected in the above-described embodiments, the present invention is not limited to those examples, and can be widely applied to any objects for which the surface shapes are evaluated or inspected in three dimensions.

Furthermore, it may be also configured such that when evaluations or inspections are performed in such a manner, the objects are continuously conveyed, so that they are continuously evaluated or inspected. Such a configuration is preferable when shape evaluations or inspections are performed on objects that are mass-produced as in the case of industrial products.

INDUSTRIAL APPLICABILITY

It can be widely used for a shape evaluation method and a shape evaluation apparatus to evaluate the surface shape of an object to be evaluated such as a vehicle, as well as for a three-dimensional inspection apparatus to inspect the surface shape of an object to be inspected in three dimensions.

The invention claimed is:

1. A shape evaluation method for evaluating a surface shape of an object to be evaluated comprising:
   a shape recognition step for recognizing the surface shape of the object to be evaluated based on a measurement value obtained from a measurement result of the surface shape of the object to be evaluated, or by reading imaginary shape data representing a shape of the object to be evaluated;
   a representative point extraction step for extracting representing points from the recognized surface shape of the object to be evaluated;
   a shape specifying step for specifying a shape for a predefined area around the extracted representing point;
   a vector defining step for defining a light source direction vector with respect to each of the representing points based on a relative position of a light source to radiate light;
   a representing point select step for selecting, from among all of the representing points, only representing points for which imaginary reflection vectors corresponding to the defined light source direction vectors are contained within a predefined range from a direction that is imaginarily defined as a visual recognition direction; and
   a highlight line creation step for creating, by using a group of all of the selected representing points as a highlight point group, a highlight line that is imaginarily generated on the surface of the object to be evaluated based on the highlight point group;
   wherein an evaluation point is added on the created highlight line; a curved line is approximated based on the evaluation point and an evaluation of the surface shape of the object to be evaluated is performed based on a curvature of the approximated curved line.

2. The shape evaluation method according to claim 1, wherein only representing points for which a plane defined by the shape specified for the predefined area around the representing point becomes parallel to an imaginary reflection vector corresponding to the defined light source direction vector are selected in the representing point select step.

3. The shape evaluation method according to claim 1, wherein the highlight line creation step comprises a step to collect highlight points contained in a predefined range with regard to given highlight points among the highlight point group and to determine a straight-line direction from the collected highlight points, and the highlight lines are created based on polygonal lines formed by connecting straight-line directions that are determined for each of the highlight lines.

4. The shape evaluation method according to claim 1, wherein a direction to be imaginarily defined as the visual recognition direction is changed and a direction for which a curvature of a highlight line, which is an evaluation value used to evaluate the surface shape of an object to be evaluated, becomes the maximum or the minimum is defined as the visual recognition direction.

5. The shape evaluation method according to claim 1, wherein the shape recognition step recognizes surface shape data of an object to be evaluated based on a measurement value obtained from a measurement result of the surface shape of the object to be evaluated.

6. The shape evaluation method according to claim 1, wherein the shape recognition step recognizes surface shape data of an object to be evaluated by reading imaginary shape data representing a shape of the object to be evaluated.

7. The shape evaluation method according to claim 6, wherein the representing point extraction step projects a plane containing a point group in which points are arranged at regular intervals on the shape data of an object to be evaluated that is imaginarily constructed and extracts the positions on the shape data at which the point group is projected as the representing points.

8. The shape evaluation method according to claim 6, wherein the shape data is corrected based on a result of the evaluation of the surface shape, and the evaluation is performed again.

9. A shape evaluation apparatus to evaluate a surface shape of an object to be evaluated, comprising an arithmetic processing portion, the arithmetic processing portion comprising:
   a portion for recognizing the surface shape of the object to be evaluated based on a measurement value obtained from a measurement result measured by a measurement portion or based on surface shape data stored in a storage area, the surface shape data being obtained when an object to be evaluated is imaginarily constructed;
   a portion for extracting representing points from the recognized surface shape of the object to be evaluated;
   a portion for specifying a shape for a predefined area around the extracted representing point;
   a portion for defining a light source direction vector with respect to each of the representing points based on a relative position of a light source to radiate light;
   a portion for selecting, from among all of the representing points, only representing points for which reflection vectors corresponding to the defined light source direction vectors are contained within a predefined range from a direction defined as a visual recognition direction;
   a portion for creating by using a group of all of the selected representing points as a highlight point group, a highlight line that is imaginarily generated on the surface of the object to be evaluated based on the highlight point group; and
   a portion for adding an evaluation point on the created highlight line, approximating a curved line based on the evaluation point, and evaluating the surface shape of the object to be evaluated based on a curvature of the approximated curved line.

10. The shape evaluation apparatus according to claim 9, comprising a measurement portion to measure surface shape of the object to be evaluated, wherein the portion for recognizing the surface shape of the object to be evaluated recognizes the surface shape based on a measurement value obtained from a measurement result measured by the measurement portion.

11. The shape evaluation apparatus according to claim 9, further comprising a storage area to store surface shape data obtained when an object to be evaluated is imaginarily constructed, wherein the portion for recognizing the surface shape of the object to be evaluated recognizes the surface shape of the object to be evaluated based on the stored surface shape data.

12. A three dimension apparatus to inspect a surface shape of an object to be inspected in three dimensions comprising a measurement portion to measure the surface shape of the object to be inspected, the three dimension inspection apparatus comprising an arithmetic processing portion, the arithmetic processing portion comprising:
   a portion for recognizing the surface shape of the object to be inspected by the measurement portion;
   a portion for extracting representing points from the recognized surface shape of the object to be inspected;
   a portion for specifying a shape for a predefined area around the extracted representing point;
   a portion for defining a light source direction vector with respect to each of the representing points based on a relative position of an imaginary light source to radiate light;
   a portion for selecting, from among all of the representing points, only representing points for which reflection vectors corresponding to the light source direction vectors that are defined based on the relative position with respect to the light source position are contained within a predefined range from a direction defined as a visual recognition direction;
   a portion for creating, by using a group of all of the selected representing points as a highlight point group, a highlight line that is imaginarily generated on the surface of the object to be inspected based on the highlight point group; and
   a portion for adding an evaluation point on the created highlight line, approximating a curved line based on the evaluation point, and performing an inspection of the surface shape of the object to be inspected based on a curvature of the approximated curved line.

\* \* \* \* \*